US006895961B1

(12) United States Patent
Todorov (10) Patent No.: US 6,895,961 B1
(45) Date of Patent: May 24, 2005

(54) METHOD AND DEVICE FOR THE AUTONOMOUS PRODUCTION, PREPARATION, AND SUPPLY OF BREATHING GAS TO DIVERS AT EXTREME DEPTHS

(76) Inventor: Gueorgui Todorov, Tegelweg 15, 22159 Hamburg (DE)

( * ) Notice: Subject to any disclaimer, the term of this patent is extended or adjusted under 35 U.S.C. 154(b) by 0 days.

(21) Appl. No.: 09/402,676
(22) PCT Filed: Apr. 11, 1998
(86) PCT No.: PCT/EP98/01976
§ 371 (c)(1),
(2), (4) Date: May 16, 2001
(87) PCT Pub. No.: WO98/49054
PCT Pub. Date: Nov. 5, 1998

(30) Foreign Application Priority Data

Apr. 11, 1997 (DE) .......................................... 197 16 749
Apr. 3, 1998 (DE) .......................................... 198 16 373

(51) Int. Cl.[7] .............................................. B63C 11/02
(52) U.S. Cl. ........................... 128/201.27; 128/204.18; 128/204.26; 128/205.28
(58) Field of Search ....................... 128/204.18, 204.26, 128/205.11, 201.27, 203.18, 205.27, 205.28, 205.22

(56) References Cited

U.S. PATENT DOCUMENTS

| 3,727,626 | A | * | 4/1973 | Kanwisher et al. | ............ | 137/88 |
| 4,964,404 | A | * | 10/1990 | Stone | ..................... | 128/204.22 |
| 5,485,834 | A | * | 1/1996 | Joye et al. | ............. | 128/205.13 |
| 5,720,279 | A | * | 2/1998 | Furuichi et al. | ........ | 128/204.26 |

FOREIGN PATENT DOCUMENTS

DE 834 201 2/1952
GB 2 208 203 3/1989

OTHER PUBLICATIONS

International Search Report.
Edwin A. Link—"Our Man–In–Sea Project", National Geographic, pp. 713–731, May 1963.
CCBS–Diving system for water depths down to 600 n—Dräger, pp. 1–8, Mar. 1988.
Gerhard F. K. Haux—"SUBSEA Manned Engineering"—Best Publishing Company, Carson, California. pp. 360–376 and pp. 438–479, 1982.

* cited by examiner

Primary Examiner—Glenn K. Dawson
Assistant Examiner—Darwin Erezo
(74) Attorney, Agent, or Firm—Burns, Doane, Swecker & Mathis, L.L.P.

(57) ABSTRACT

The invention relates to a fully closed circuit-pendulum-storage system wherein a given amount of a ready to breathe gas mixture made of various inert gases including hydrogen and oxygen is continuously conveyed between two highly pressurized gas containers. Initially, the required breathing gas leaves the pressurized gas container and reaches the circuit at a constant dosage according to the overdosing principle. The circuit consists of an inhalation bag, a diving helmet, an exhalation bag and a single or double pack $CO_2$ absorption filter. At a depth of 0–100 m a mixture of oxygen, nitrogen and helium is used as a breathing gas. At a depth of 100–700 m a given amount of hydrogen is mixed therewith according to the wishes of the diver, whereby the oxygen content should not exceed 3 vol. %. When the diver emerges from a depth of over 100 m, the hydrogen is removed from the breathing gas and from the circuit by means of palladium membrane diffusion or catalytic water conversion. The removal of hydrogen is controlled by hydrogen detectors. At this point only, the oxygen content can exceed 3 vol %.

27 Claims, 8 Drawing Sheets

TABELLE I

Darstellung einer Tiefenbereichstufung von 50 zu 50 m, entsprechende Gasgemisch- und Konstant-Dosierungs-Stufung und Ansaug-Leistungs-Stufung des Hoch-Druck-Verdichters

| | Stufe 01 | Stufe 02 | Stufe 03 | Stufe 04 | Stufe 05 | Stufe 06 | Stufe 07 |
|---|---|---|---|---|---|---|---|
| | Gemisch 01 20% O₂, 80%He | Gemisch 02 15% O₂, 85%He | Gemisch 03 12.5% O₂, 87.5%He | Gemisch 04 10% O₂, 90%He | Gemisch 05 7.5% O₂, 92.5%He | Gemisch 06 6% O₂, 94% He | Gemisch 07 5% O₂, 95%He |
| Dosierung: | 10.5 L/min | 20.5 L/min | 30.5 L/min | 40.5 L/min | 50.5 L/min | 55.5 L/min | 60.5 L/min |
| Ansaugleistung des Verdichters: | 10 L/min | 20 L/min | 30 L/min | 40 L/min | 50 L/min | 55 L/min | 60 L/min |
| Wassertiefe 0 - 50 m | 50 | 100 | 150 | 200 | 250 | 300 | 350 |

| | Stufe 08 | Stufe 09 | Stufe 10 | Stufe 11 | Stufe 12 | Stufe 13 | Stufe 14 |
|---|---|---|---|---|---|---|---|
| | Gemisch 08 3% O₂, 97%He | Gemisch 09 2% O₂, 98% He | Gemisch 10 1.5% O₂, 98.5%He | Gemisch 11 1% O₂, 99%He | Gemisch 12 0.65% O₂, 99.45% He | Gemisch 13 0.5% O₂, 99.5% He | Gemisch 14 0.48% O₂, 99.6% He |
| | 65.5 L/min | 70.5 L/min | 75.5 L/min | 80.5 L/min | 85.5 L/min | 90.5 L/min | 95.5 L/min |
| Wassertiefe m | 400 | 450 | 500 | 550 | 600 | 650 | 700 |
| | 350 | Gemisch 15 0.3% O₂, 99.7% He | Gemisch 16 0.2% O₂, 99.8% He | | | | |

Dosierung: 100.5 L/min 105.5 L/min Ansaugleistung respektiv-100 und 105 L/min
700m 750m 800 m

Fig. 4a

TABELLE II

Darstellung der Tauchzeit, in Abhängigkeit von erreichte Tiefe, Stromverbrauch und vorhandenen Strom-Kapazität in Ah

| | Tiefenbereich-Stufung | Ansaugleis-tung des Ver-dichters | StromVerbrauch Kw/Ah | Tauchzeit in Stunden | | | | |
|---|---|---|---|---|---|---|---|---|
| | | | | Batterie: 600 Ah | 300 Ah | 150 Ah | 100 Ah |
| 1 | 0 – 50 m | 10 L/min | 0.3 Kw / 24 Ah | 24 Stunden | 12.5 Std | 6.2 | 4.1 |
| 2 | 50 – 100 m | 20 L/min | 0.4 Kw / 33 Ah | 18 – " – | 9 | 4.5 | 3 |
| 3 | 100 – 150 | 30 L/min | 0.5 Kw / 38 Ah | 16 – " – | 7.5 | 4 | 2.6 |
| 4 | 150 – 200 | 40 L/min | 0.6 Kw / 45 Ah | 13 – " – | 6.5 | 3.3 | 2.2 |
| 5 | 200 – 250 | 50 L/min | 1.1 Kw / 90 Ah | 6.5 | 3.3 | 1.6 | 1.1 |
| 6 | 250 – 300 | 55 L/min | 1.2 Kw / 95 Ah | 6.2 | 3.1 | 1.5 | 1.0 |
| 7 | 300 – 350 | 60 L/min | 1.3 Kw / 100 Ah | 6.0 | 3.0 | 1.4 | 0.95 |
| 8 | 350 – 400 | 65 L/min | 1.4 Kw / 110 Ah | 5.5 | 2.7 | 1.3 | 0.9 |
| 9 | 400 – 450 | 70 L/min | 1.5 Kw / 120 Ah | 5.0 | 2.5 | 1.25 | 0.8 |
| 10 | 450 – 500 | 75 L/min | 1.6 Kw / 130 Ah | 4.5 | 2.2 | 1.15 | 0.75 |
| 11 | 500 – 550 | 80 L/min | 1.7 Kw / 150 Ah | 4.0 | 2.0 | 1.0 | 0.65 |
| 12 | 550 – 600 | 85 L/min | 1.8 Kw / 160 Ah | 3.8 | 1.8 | 0.9 | 0.6 |
| 13 | 600 – 650 | 90 L/min | 1.9 Kw / 170 Ah | 3.5 | 1.7 | 0.8 | 0.58 |
| 14 | 650 – 700 | 95 L/min | 2.0 Kw / 180 Ah | 3.3 | 1.6 | 0.75 | 0.55 |
| 15 | 700 – 750 | 100 L/min | 2.1 Kw / 190 Ah | 3.1 | 1.5 | 0.7 | 0.5 |
| 16 | 750 – 800 | 110 L/min | 2.2 Kw / 200 Ah | 3.0 | 1.4 | 0.65 | 0.45 Std |

METHOD AND DEVICE FOR THE AUTONOMOUS PRODUCTION, PREPARATION, AND SUPPLY OF BREATHING GAS TO DIVERS AT EXTREME DEPTHS

FIELD OF THE INVENTION

A method for the production, enrichment, and supply of breathing gas to divers at depths from 0 to 1000 m and a fully autonomous back-worn device for its implementation are invented.

DESCRIPTION OF RELATED ART

In the well-known open-circuit or semiopen-circuit rebreathers, gas consumption increases strongly at depths greater than 50–100 m. The loss of breathing gas can be completely eliminated only by the use of closed circuit.

DE-C-834 201 (Draegerwerk, Luebeck) is a self-mixing closed-circuit rebreather.

In the method, the quality of breathed-in, respectively breathed-out air is measured, and depending on the difference between these quantities, oxygen is fed-up.

GB A-2 208 203 (Carmellan Research Ltd.) is a self-mixing rebreather of the Rexnord CCR type. These rebreathers were designed following the appearance on the market of an American space mission waste product capable of measuring with adequate precision and reliability the crucial partial oxygen pressure. In a completely closed circuit the rebreather is brought by the use of inert gas, at a surrounding pressure typical of the diving depth. Then, in accordance with the readings of the oxygen sensor, it is adjusted at the desired O2 partial pressure which means that, in the course of the diving process, only the oxygen that has actually been used by the diver is replaced.

In this method, the data for the oxygen partial pressure and the quantity of CO2 are processed and regullated by the software of the personal computer on the surface.

At depths greater than 50–100 m, the use of this self-mixing Closed-Circuit Rebreather (CCR) is almost impossible, for technical or safety-related reasons. The major shortcomings are three:

The breathing-gas-mixing electronics which regulates the precise partial oxygen pressure in the used helium-oxygen mixtures, is not absolutely safe; the diver pumps-out the breathing gas through the rebreather by his own lungs, so as to remove the breathed-out CO2 from the rebreather's closed circuit (at 300 m depth, the density of the gas is 31 bars). In contrast to the open circuit, in the closed circuit, the continuous gas do not flows away, washing-out the abundant contaminants. At great depths, the allowed oxygen and carbon dioxide operation space becomes smaller and smaller, thus enhancing the risk of CO2 or O2 intoxication.

OBJECTS AND SUMMARY

Another shortcoming: at depths of 200–500 m, the rebreather can be used for no more than 15–20 minutes for the lack of gas.

So, the innovation was underlaid by the task to construct a method for the enrichment and purification of gas and the production of breathing gas mixture, depending on the respective diving depth. Simultaneously with this, adequate gas provision and protection had to be ensured, so as to supply the diver with the mixture of breathing gas needed at smaller or greater depths. Based on this method, a fully autonomous back-worn diving rebreather had to be designed.

The innovative solution of this task is described through a completely closed circuit-pendulum-storage-system, a certain amount of ready-made breathing gas mixture, consisting of inert gas (helium) and oxygen, is continously conveyed between two high-pressure gas containers (15, 29), whereas in the beginning, based on overdosing and constant dosage principle, the needed breathing gas mixture reaches the closed circuit, consisting of an inhalation bag (37), a diving helm (6), an exhalation bag (11), double pack CO2-absorption filter (16, 17). The advance of the breathing gas along this closed circuit is speeded-up by a low-pressure membrane pump (13). The breathing gas is cleared of $CO_2$ and other contaminants, dried and warmed-up, enriched additionally with pure oxygen on constant dosage principle according to the admissible partial oxygen pressure for the respective depth, and enriched with inert gas on eventual loss. Finally, the excessive quantity of breathing gas is pumped-in by high-pressure compressor (23) (piston or diaphragm version) and stored at high pressure of 220–450 bar in one of the two high-pressurized containers (15, 29). After the whole quantity of breathing gas mixture has been stored in one of the containers, a magnet-valve (31) is switched over and the same process starts in the reverse direction—from the full container to the empty one.

In this way, a really completely closed circuit is created, in which the expensive inert gas (helium)-oxygen-gas mixture is used 100%, and consequently-with no loss. Gas supply in this system can be effected mainly by a ready-made gas mixture, based on constant dosage principle, i.e. mechanically and not electronically; the electronics used will eventually play only a second part which greatly enhances diving security. The enrichment of the breathing gas mixture with oxygen according to the admissible O2 partial pressure can be effected also based on consage princuple, wheras self-mixing automation will only play a second part.

Since the compressor (23) is powered by one or two electric motors with direct current 12V/24V, having an overall power of 2 to 3 kW, which is supplied by one or more accumulators with electric capacity between 100 and 600 or more ampers per hour, the duration of diving will no longer depend on breathing gas but on the electric capacity available. Thus, diving times from a couple of hours for depth of 700–800 m, to 24 or more hours for small depths are provided; a prerequisite for this is the regular change of CO2 filters; the diver can be supplied additionally with power by an electric cable from the surface, a submarine or a submarine station, which is much more effective than hose supply. The difference is that the diver can switch this connection on and off at any time, cable supply being much lighter, more compact, and safer than hose supply.

This method possesses many more advantages: the compressor and the electric motors are oil-cooled, whereas the heat thus released is made use of by a thermal exchanger, producing hot water; in this way, the diver, the breathing gas, and the rebreather are kept warm which is extremely important for diving; by an additional equipment, comprising one or two electric motors with overall power of 0,3–0,5 kW, 12V/24V, the diver can advance at the speed of 4–6 knots at a distance of 30–200 km, depending on the capacity of the accumulator current. The possibility also exists for continuous use of light, photo, TV, video, navigation, speaking, diving-computer, deko-stops-computer, and other equipment, all known-so-far types of electric and hydraulic-mechanical instruments and devices. Last but not least, stands the possibility for the rebreather's switching over to some of the operating principles of the rebreathers known-so-far: open system, semi-closed system, closed system with mixed gas circulating in the closed circuit with automatic enrichment of the O-2, even closed system with pure oxygen gas circulating in the closed circuit, whereas with the latter all necessary measures should be taken for the safety of diving with oxygen rebreathers. These systems are optionally used, depending on the task set, the switching on and off of the high-pressure connection with the compressor, or if necessary—depending on the lost of the electric capacity, the damage or absence of the electric motors or the compressor (as an emergenccy system).

This new pressure-pendulum-storage system makes it possible to supply the diver with different breathing gas mixtures at depths from 0 to 700–800 m for a relatively long period of time. The method has even potential for depths of 1000 m and more, and can be used even when the 700 m limitations for diving depth are relieved by science.

The long-term application provides for quick diving without a diving camera (Bounce-Diving) at depths up to 300–350 m, and free emergence to the surface, observing the emergence time (deko-stops) or leaving a submarine at a definite depth, for instance 300 m, operating at 600–700 m, and then going back on one's own. A portable cable drum with a winsch is equipped, providing the diver with the opportunity to optionally or necessarily establish voice and electric communication with the surface.

The compact structure of the rebreathers, based on this principle, allows for diving directly from the beach, a boat, a ship, a submarine, a submarine station, an airplane or even by parachute jump. The device can be used for trade, sports, military, scientific, archaeological and other purposes. Totally new prospects and application fields emerge as to the military and other tasks. For instance, now it will be possible for the first time to organize not only small sabotage reconnaissance groups, but whole divisions of a couple of thousand diving marines, to master the great depths of 0–1000 m, to operate within a field of reach of 100–200 km, to carry and apply all available types of weapons, to advance at a great speed between 6 and 10 knots ore more.

Simultaneously with this, the innovation makes it possible for any private person to use the device, reaching on one's own great depth with little effort to look for treasures, deal with sport, archaology etc.

The innovation provides for the further development of some branches of sea study and sea industry, for instance, the direct extraction of manganese, petrol and gas at sea depths of 700 m (in future, eventually at 100 m or more).

BRIEF DESCRIPTION OF THE DRAWINGS

FIGS. 2(a–d) are front, side, top, and bottom views of the first exemplary embodiment of the system and method for providing breathing gas to a diver.

FIGS. 2(e–g) are front, side, top, and bottom views of the second exemplary embodiment of the system and method for providing breathing gas to a diver.

DETAILED DESCRIPTION OF THE PREFERRED EMBODIMENTS

Figure 1:
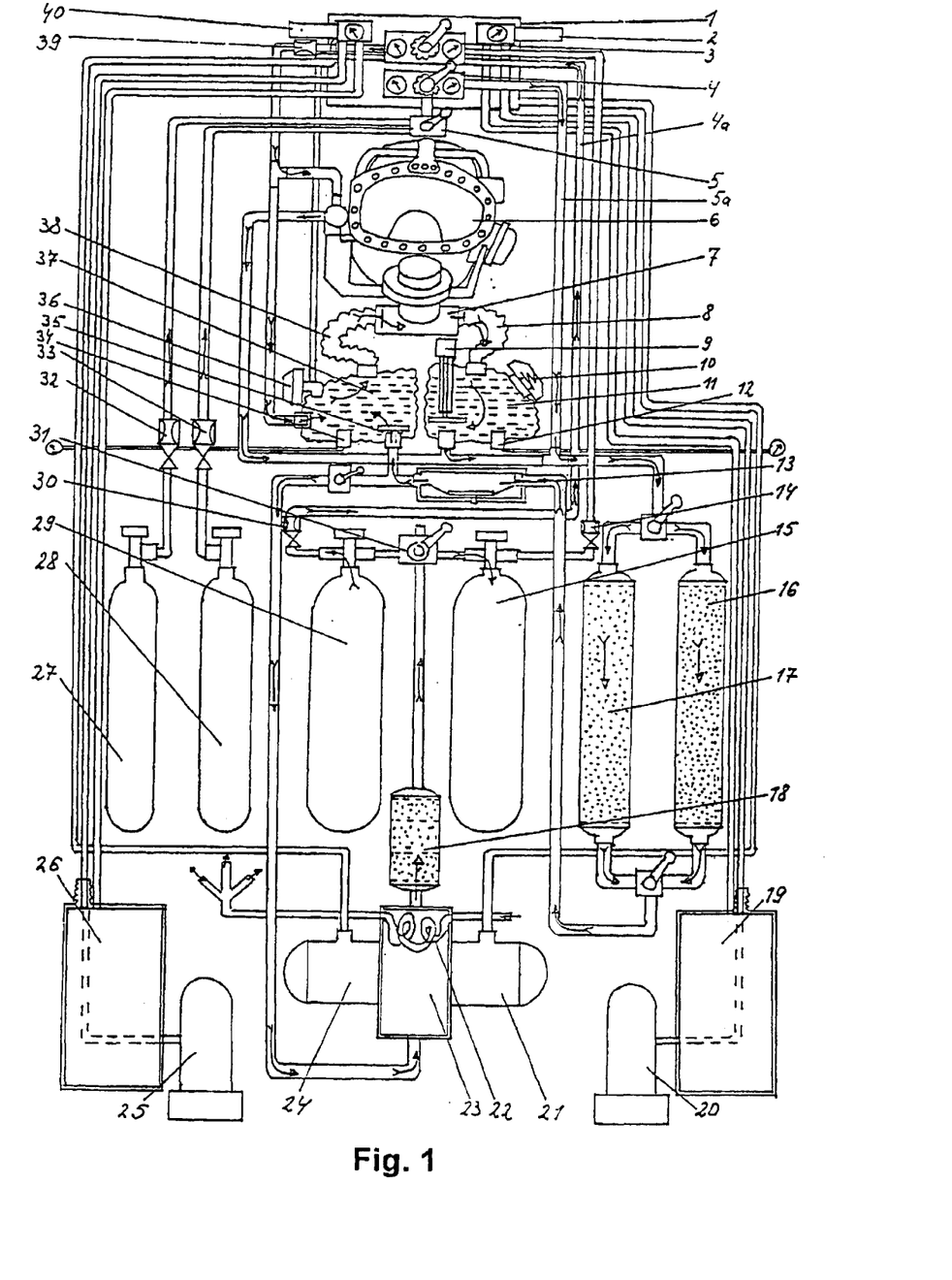
FIG. 1 is a schematic view of a first exemplary embodiment of a system and method for providing breathing gas to a diver.

The operational principle of the method and the autonomous back-worn diving rebreather implementing it are shown in greater detail in FIG. 1.

According to a first exemplary embodiment, illustrated by FIG. 1, the pressurized containainer (a steel bottle with mixed gas) (29), the gas flows out through the open valve and the high-pressure connection to the one-stage pressure reductor (30) for being reduced to above-crucial pressure up to 110 bar, depending on the diving depth. Then, through the dozing nozzle (39), the gas heads for inhalation bag (37) or directly to diving helmet (6) from where it reaches the respiratory organs of the diver.

During the exhaling phase, the gas flows backward through exhalation bag (11) or directly from diving helmet (6) into the two absorption filters (16, 17), from where it is drawned into by the low-pressure membrane pump (13), and through non-return valve (35) it flows into inhalation bag (37) again. Thus, the circuit is closed. The low-pressure membrane pump (13) is activated by electric impulses; its role is to continuously force the breathing gas into this closed circuit, so that the diver experiences smaller breathing resistance, hence relieved breathing with the compressed gas.

The excessive gas, amounting from 10 to 100 normal l/min, depending on the diving depth, does not leave the device's closed circuit through outlet valve (10) into the surrounding water (as is the practice in the semi-closed systems) but is pumped into by compressor (23), compressed and stored at high pressure 220–450 bar through the triple valve (31), in the second mixed gas container (15), the latter being empty in the beginning.

The compressor (23) is of the piston- or, the preferred version being membrane-hightension-compressor with power of 220–450 bar pressure, pumping and delivery power between 10 and 100 l/min, powered by two electric motors with direct current 12V/24V (21, 24), and overall power of 2 to 3 kW. The electric motors are powered by one or more accumulators (19, 26) with 12V/24V direct current and capacity from 100 to 600 Ah or more, depending on the design. The accumulators can be of the type lead/acid, nickel/cadmium, or silver/zinc. They are housed within oil boxes to equalize the pressure.

Compressor (23) compresses the excessive breathing gas through filter (18), which consist of condensate-separator, oil filter (with piston compressor), contaninant absorber, odours- and drying filter, whereas the excessive breathing gas is purified and stored in the second mixed-gas container (15) under pressure of 220–450 bar.

Figure 4:
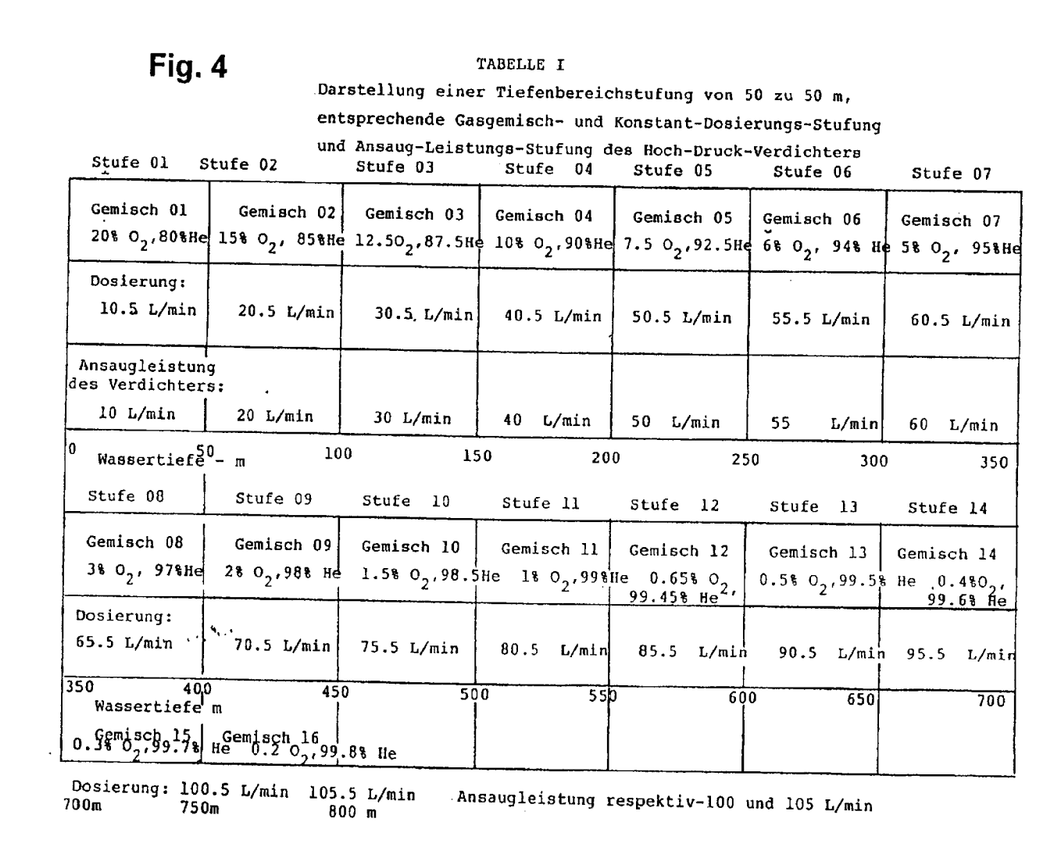
FIG. 4 is a table showing the increasing volume of breathing gas required by a diver as the depth of the diver increases.
Figure 4A:
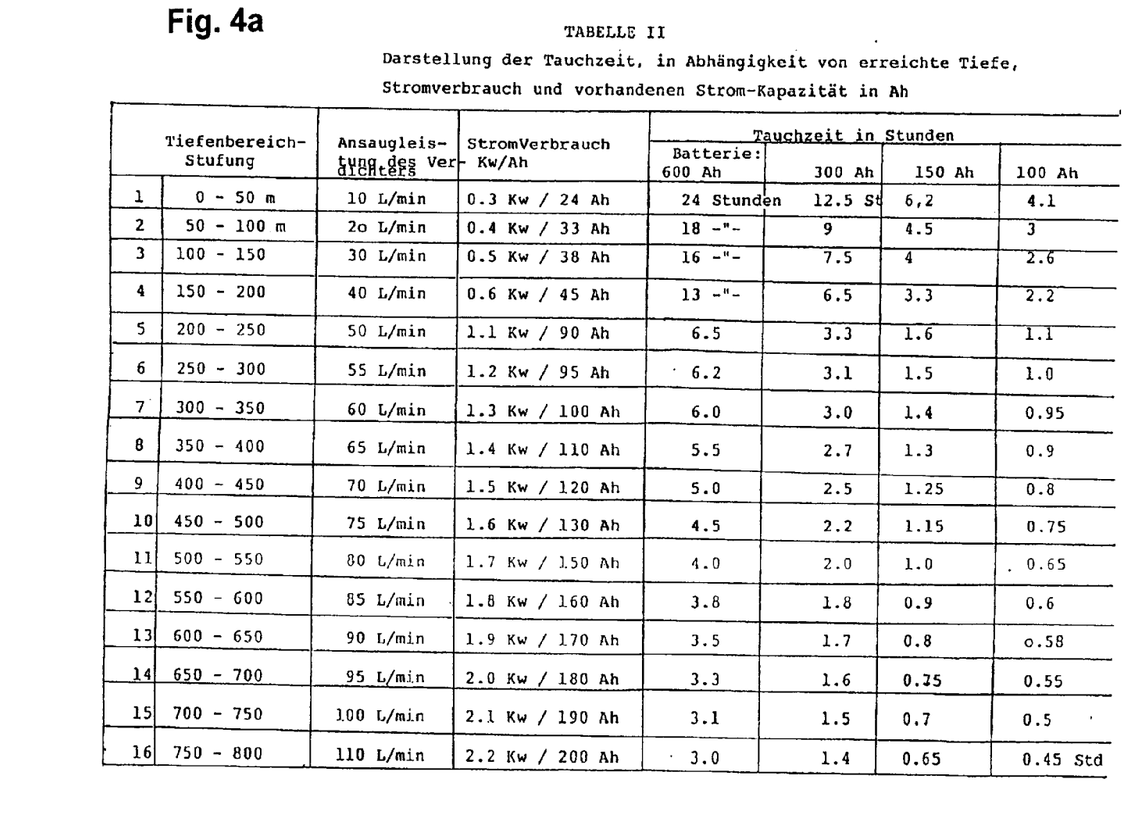
FIG. 4a is a table showing the increasing amount of energy required to deliver an increasing volume of breathing gas to a diver as the depth of the diver increases.

The device is designed for 16 or 18 main regions of deep diving. To each of these regions, a definite dosage and a definite gas mixture is assigned. The assigned quantity of gas mixture remains constant, regardless of the diving depth. These 16 or 18 deep diving regions are shown on Tables I and II.

The gas flow into inhalation bag (37) is effected automatically or is optionally manually regulated by dosing valve (39) of the breast-worn control panel (1), and can be set at 10 l/min (0–50 m) to 95–100 l/min (600–700 m), depending on depth.

The outflow of the gas mixture and the power of compressor (23) can also be effected automatically or can be regulated manually by the regulation of the electric current supply of the two electric motors (21, 24), through the switch-potentiometers (2, 40) of control (1), whereupon an amper-receipt from 24 to 200 ampers per hour is established. According to this amper-receipt of the electric motors, the compressor can provide pumping-in or supply power from 10 to 100 l/m. This quantity of breathing gas which is stored by the high-pressure compressor in the second container of mixed gas, is about 10–15% of the whole amount of breathing gas a diver needs per minute at the respective depth, the remaining gas continuing to proceed along the closed circuit. Thus, the direct current used is economized for compressing and keeping the gas for repeated use.

To avoid cases of emergency, and to prevent the appearance of differences between gas inflow and the sucking power of the compressor, are dosing valve (39) and switch-potentiometers (2, 40) synchronized. Exhalation bag (11) is additionally supplied with safety valve (9) which, by closing, prevents that the compressor is pumping more then necessary breathing gas out of the closed circuit or of the diver's lungs. Besides, safety valve (9) is supplied with switch-off automation which switches off electric motors (21, 21) in case of need. Inhalation bag (37) is supplied with demand gas regulator (36) which, in case of need, provides additional amount of breathing gas or, in some exceptional cases, provides for the overall system to be transferred into an open-circuit rebreather.

Depending on the diving depth, and the needed gas mixture pumping power of the compressor, motor circuit consumption respectively, the duration of diving and operation is between 3 hours for diving depths of 600–700 m, up to 24 hours and more for diving depths of 0–100 m, depending on the electric capacity of the electric accumulators.

Compressor (23) and electric motors (21, 24) are placed within a steel housing and are oil-cooled. The generated heat is passed to the diver through thermal mixer (22) as 43–45° C. hot water to prevent him, the breathing gas, and the rebreather from the cold of the deep.

The outlet valve (10) is switched on in case of quick emergence to the surface or eventual differences between more then needed gas inflow and less sucking-in power of the compressor—the excess gas is exhausted directly into the water.

As the mixed gas container (15) is being filled with purified gas under high pressure (220–450 bar), triple valve (31) is switched over (automatically or manually), and the same process is repeated; this time the pressure of the full mixing gas container (15) is reduced to the above-crucial pressure of the compressed breathing gas, and through dosing nozzle (39) of control panel (1) is supplied to the inhalation bag or directly to the diving helmet. The exhaled gas reaches again inhalation bag (11), then CO2-absorption filters (16, 17), after which it is drawned-in by the low-pressure membrane pump (13), and then flows back into the inhalation bag (37) through non-return valve (35). The excessive breathing gas is sucked in by the high-pressure compressor (23), purified by filters (18), and pumped in the now-empty mixed-gas container (29) under high pressure of 220–450 bar. The process could be repeated as long as there is certain accumulator electric capacity.

Additionally in this process, through the pressure-reductor and dose-nozzle (33), pure oxygen is supplied to exhalation bag (11) from highly-pressurized steel container (28), based on constant dosage principle, so that the oxygen share within the overall mixture be kept constant within the admissible limits. Similarly to the dosing of mixed gas, the additional dosage and inflow of oxygen for the 16 main depth regions is constructed and established in such a way, so as to provide complete synchron between the dosing of mixed gas and oxygen, ensuring for the oxygen partial pressure to remain constant within the desired depths.

In cases of emergency, when the compressor or the electric motors do not work for one reason or other, the closed-circuit process can be fed-up by the low-pressure membrane pump (13) which operates on the principle of electromagnetic impulses or can be powered by a small electric motor, provided the accumulators have some electric capacity. Thus, the oxygen inflow from steel bottle (28) goes on, based on the principle of constant dosing. This is possible because there is enough of the oxygen-inert gas mixture, of course, for a definite period of time within the overal closed-circuit process: exhalation- and inhalation bag, diving helmet or mouthpiece, inhalation- and exhalation hoses, CO2-absorption filters, etc. (about 25–30 l volume in all, plus the respective depth pressure which, at 300 m for instance, is 31 bar; this makes 900 normal volume liters in all). Then the diver can switch over the device to the semi-closed circuit regime, thus providing for the use of the available amount of mixed gas.

To control the oxygen content of the breathing gas mixture, the device is supplied with sensors and meters of the oxygen content (12), and CO2 (34).

In case of eventual loss, depending on the need, additional amount of inert gas (helium) is taken from the steel container (27), and through the pressure reducer and dosing-nozzle (32) is fed to exhalation bag (11).

To overcome strong underwater streams or to provide for horizontal or vertical motion, an additional equipment is provided, comprising electric driving motors (20, 25) with overall power of 0.3–0.5 kW, 12V/24V, which can allow the diver to move with velocity of 4–6 knots or more. Based on the used accumulator capacity and the needed water depth, a distance of 30–200 km can be overcome, which attributes quite a new quality to diving.

To reduce the resistance of water and to increase velocity, additional equipment is provided, consisting of different versions of special streamline covers that can be mounted on the basic device.

A specially-designed-for-the-purpose diving computer can prove quite useful, providing the diver with a continuous picture of all needed parameters: for instance gas inflow, gas dosage and stock, gas and environmental pressure, gas and water temperature, diving time, deko-stops, power of pumping-in and compressor supply, electric capacity, O2 and CO2 contents, rotation number of the electric motors, water heating temperature, distance, velocity of water stream, velocity of motion, navigation parameters etc.

The cover of the device houses as well two or more lights, video, TV, and photo camera, ampermeter, and voltmeter, O2- and CO2-meter, a device for submarine voice communication, navigation and orientation devices. The rebreather can be additionally supplied with an electric cable and a glass-fibre cable, at the advantage that the diver can at any time switch off this connection, and switch it on after some time. The option exists for the CO2-filters to be changed under water, one of them continuing to work meanwhile. And last but not least, the cable and video-connection with the surface provides for the unique opportunity to control and advise the diver in the course of his work; in case of emergency, the device can be directly refunctioned into ROV (Remote Operation Vehicle) by the control office, and if the diver cannot do this himself, be moved to a submarine or station by the use of the driving motors.

The device can be produced in more than 10 different versions and models, differing by the capacity of the accumulators and the steel bottles, power of the motors and compressors, dimensions, form, size, and purpose of use.

Under water, the device has neutral weight, and above water it weighs between 50 and 150 kg; the device can be lifted above water only by the use of a small crane or can be brought to water on small rollers. Its dimensions vary as follows: length about 450–800 mm, width about 450–500 mm, height about 250–300 mm. It provides for the diver's entering into water through a hatch with internal diameter of 700–900 mm. All parts of the device are protected by a streamline cover, made of glass-fiber-strengthened poliester tar or nirosteel tin, preventing it from mechanical damage.

In this method, and the implementing it autonomous back-worn rebreather, designed for the autonomous production, enrichment, and supply of breathing gas to divers at depths of 0–1000 m, in one closed circuit pendulum-storage system, a definite quantity of ready-made gas mixture, consisting of one (or more) inert gas and oxygen, is continuously conveyed between two high-pressurized containers (15, 29), whereas in the beginning, the needed breathing gas enters, based on the overdosing and constant dosage principle, the closed circuit, consisting of inhalation bag (37) a diving helmet (6), exhalation bag (11), and a double pack of CO2-absorption filters (16, 17). The advance of the breathing gas along this closed circuit is speeded-up by a low-pressure membrane pump (13); the breathing gas is cleaned of CO2 and other contaminants, dried and warmed-up; then, it is additionally enriched with pure oxygen according to the admissible oxygen partial pressure for the respective depth, based on constant dosage; it is also enriched with inert gas (or inert gas mixture) on eventual loss; finally, the excessive quantity of breathing gas is drawned-in by a compressor under high pressure (23) (piston- or diaphragm construction), and is stored under high pressure of 220–450 bar in one of the two highly-pressurized containers (15 or 29), After the whole quantity of breathing gas mixture has been stored in one of the high-pressurized containers (15 or 29), a magnet-valve is switched-over and the same process starts in the reverse direction-from the full to the empty container.

The high-pressure compressor (23) is powered by one or two direct-current electric motors (21, 24) which, on their part, are current-supplied by one or more accumulators (19, 26). Thus, the duration of diving depends no longer on the available breathing gas but on the available current capacity. The compressor (23), and electric motors (21, 24) are oil-cooled, and the heat thus generated is used through a thermal exchanger (22) for the production of hot water which reaches the diver and the rebreather. The rebreather is also supplied with one or two electric motors to move the diver in the horizontal or vertical direction with speed of 6 or more knots at a distance of 30 to 200 km. The diver can at any time establish communication with the surface by a cable, to use all electric and hydraulic-mechanical instruments known-so-far, to have continuously in his disposition light, photo, video, navigation, computer and other types of equipment, being able to stay under water for 24 hours or more.

In diving under hyperbar conditions at depths greater than 300–400 m, the respiratory function is intensified because of the higher density of breathing gas which results in a drastic reduction of the diver's abilities. For the execution of average-heavy or heavy work at depths greater than 400 m, man orients himself towards hydrogen as inert gas.

The oxygen-helium-hydrogen breathing mixture, called "hydromix" has density which is about 42% smaller than the density of the gases used-so-far. It relieves the diver's respiration, and allows to work underwater at sea depths of 400 to 1000 m.

Diving with "Hydromix" breathing gas is delivered by a transport camera and hose supply. No autonomous rebreathers, using "Hydromix" as breathing gas are known so far.

According to a second exemplary embodiment, the new pressure-pendulum-storage method for the autonomous production, enrichment and supply of breathing gas to divers at small or extreme depths, described in the first exemplary embodiment, allows for the use of individual inert gases or different inert gas-oxygen mixtures including hydrogen.

When using hydrogen, certain safety measures must be taken. It is well-known that, without the needed content of 4 Vol. % oxygen, hydrogen cannot ignite. That is why, the oxygen content of maximum 3 Vol. % must not be exceeded which means that the breathing gas mixture of oxygen, helium, and hydrogen can be used only at depths of 50 to 700 m (in future, eventually up to 1000 m). To use the same breathing mixture without hydrogen at depths of 0–50 m, with increased oxygen content, hydrogen must be removed from the mixture by separation or catalytic burning.

The separation of hydrogen from helium can be made by a paladium membrane-diffusion cell. Only after hydrogen has been completely separated from the breathing mixture, can the oxygen content be increased to 4 Vol. %.

Figure 1A:
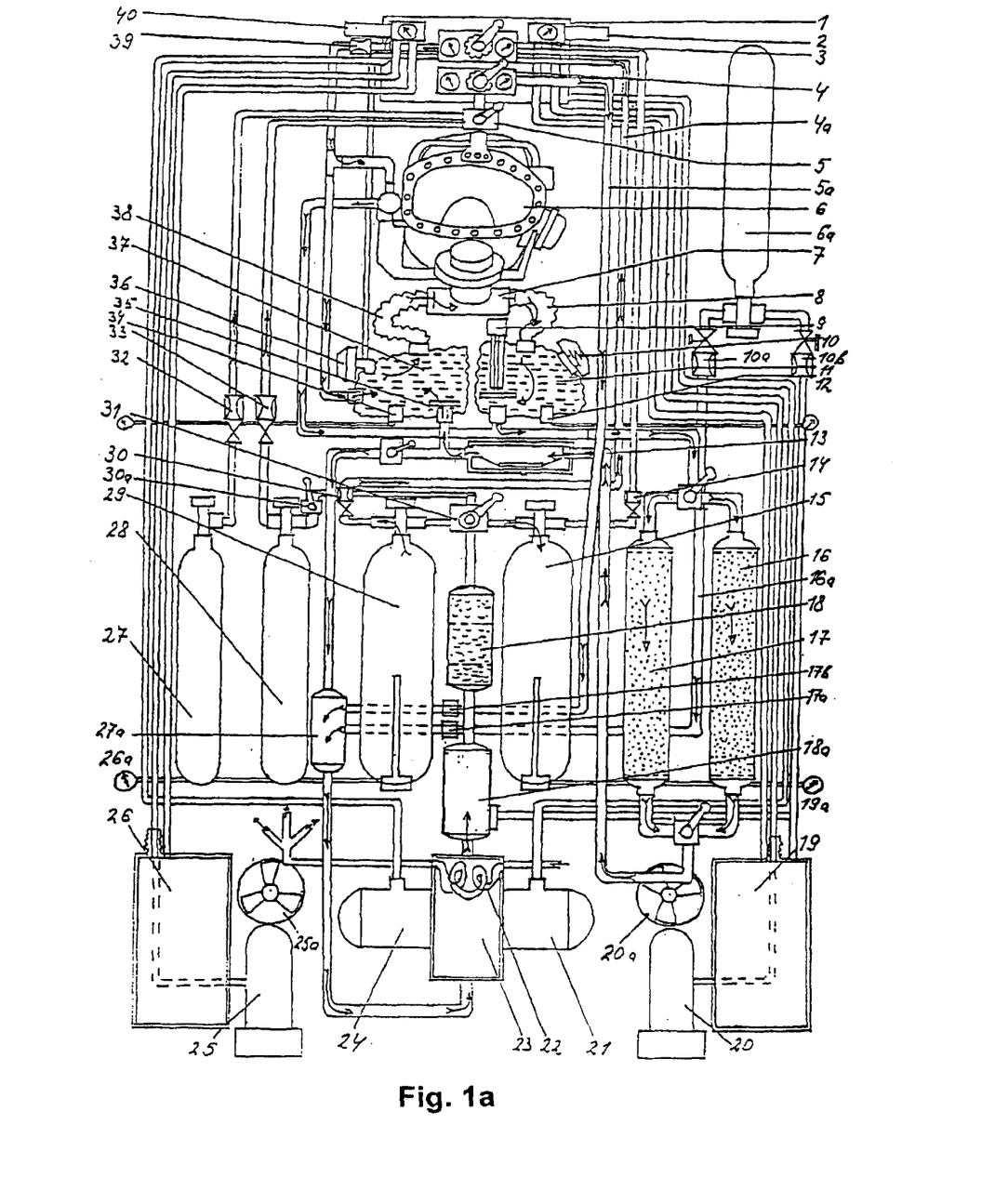
FIG. 1a is a schematic view of a second exemplary embodiment of a system and method for providing breathing gas to a diver.
Figure 2A:
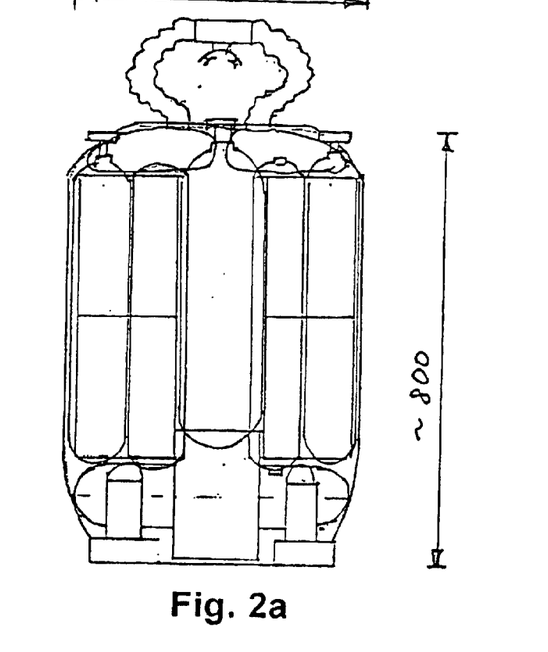
Figure 2B:
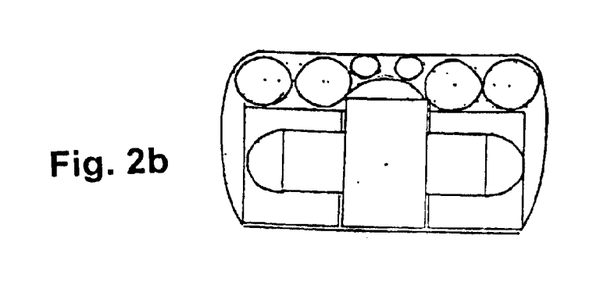
Figure 2C:
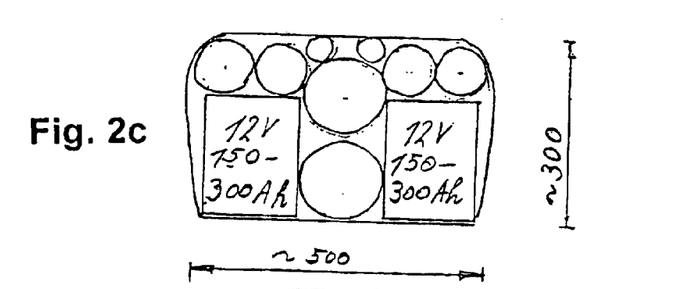
Figure 2D:
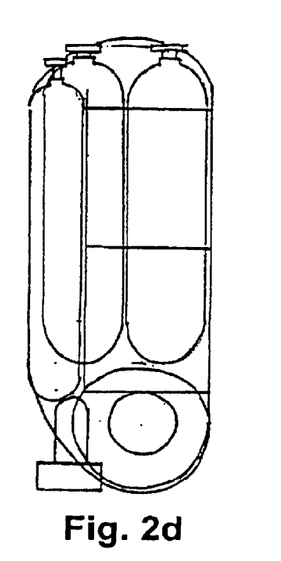
Figures 2E, 2F, 2H:
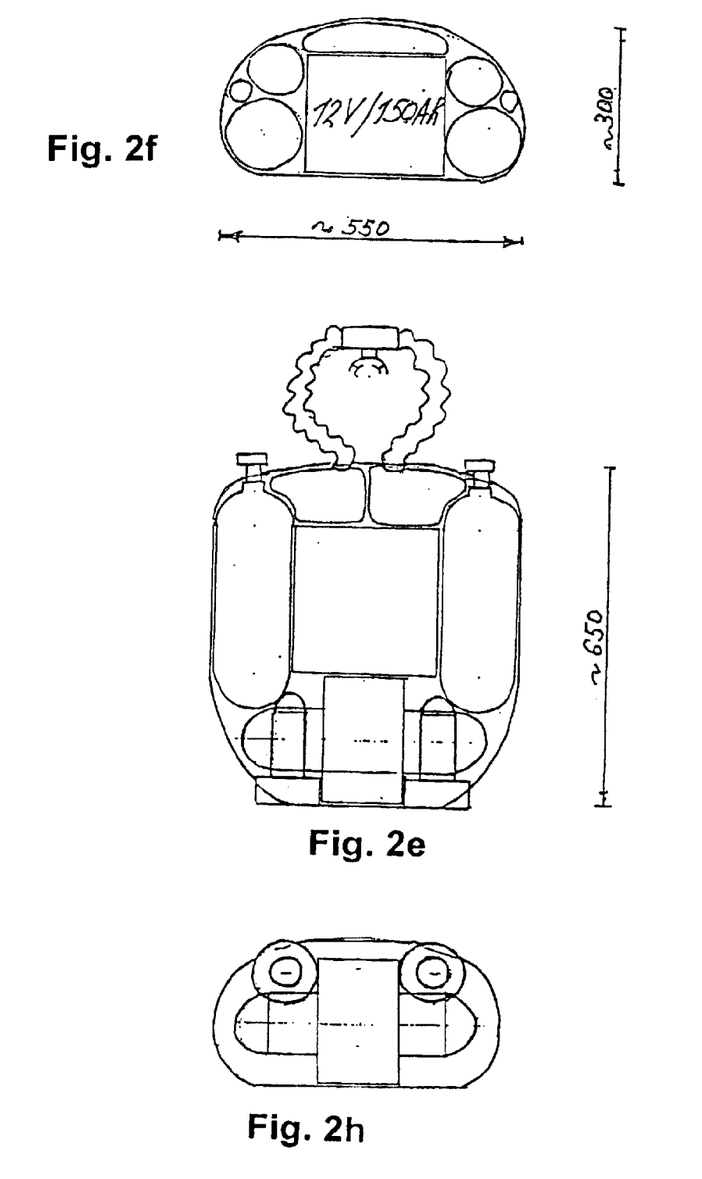
Figure 2G:
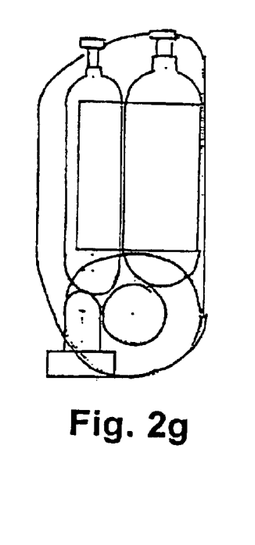
Figures 3A, 3B, 3C:
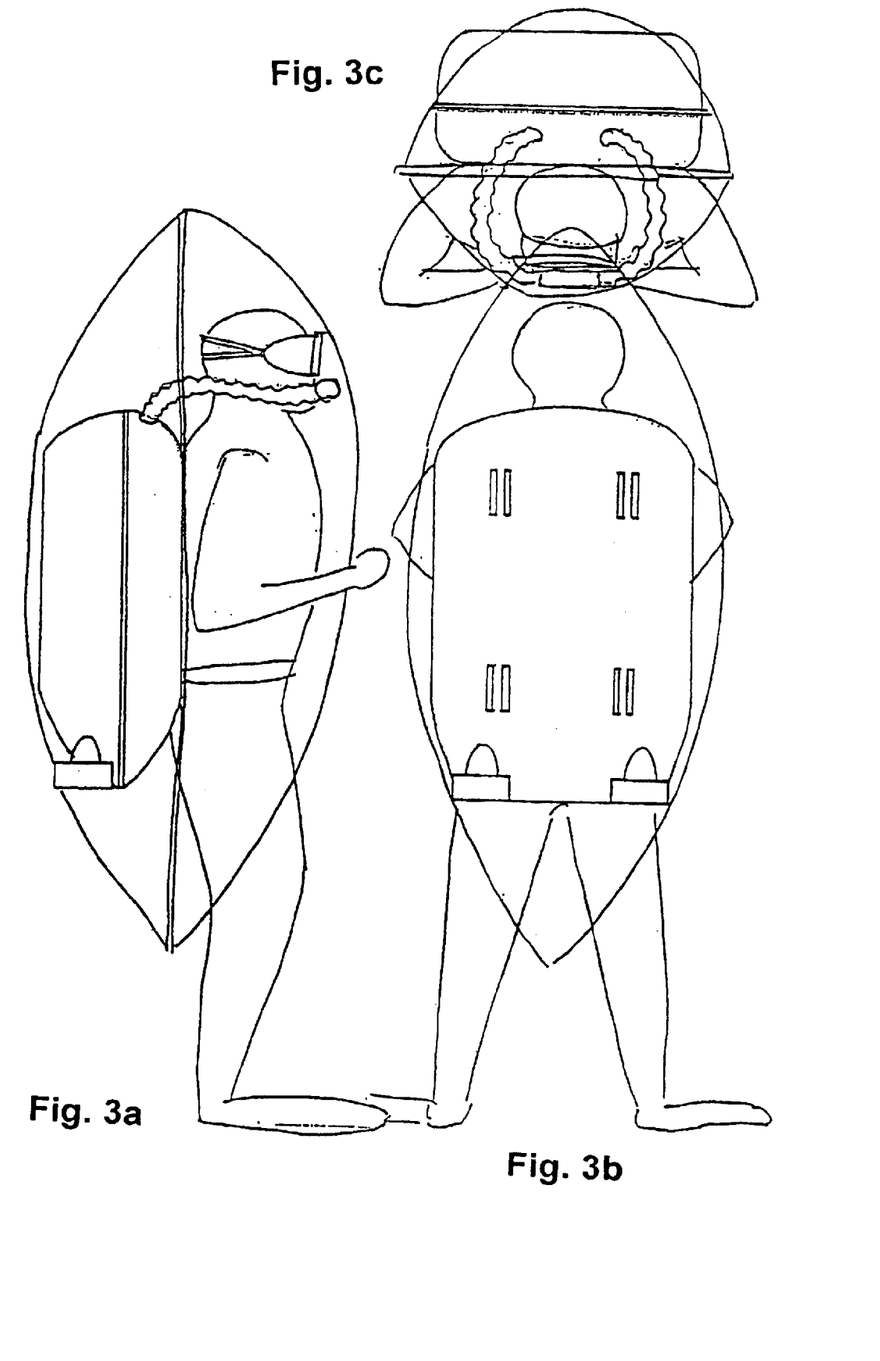
FIG. 3a includes side, back, and top views of a diver wearing the second exemplary embodiment of the system and method for providing breathing gas to a diver.
Figure 3D:
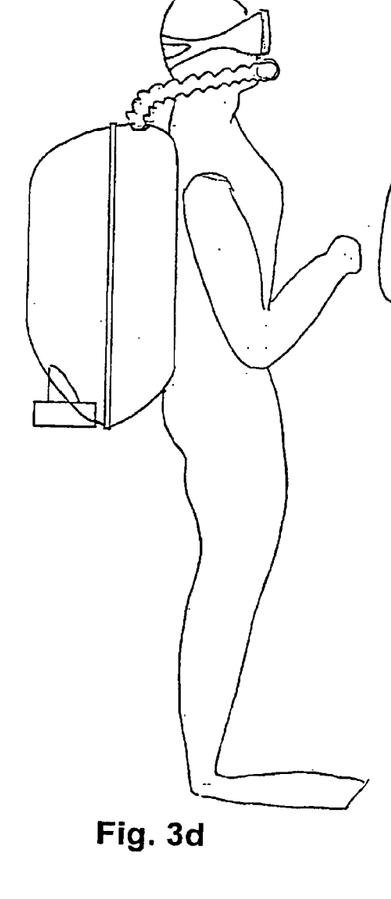
FIG. 3 includes side, back, and top views of a diver wearing the first exemplary embodiment of the system and method for providing breathing gas to a diver.
Figure 3E:
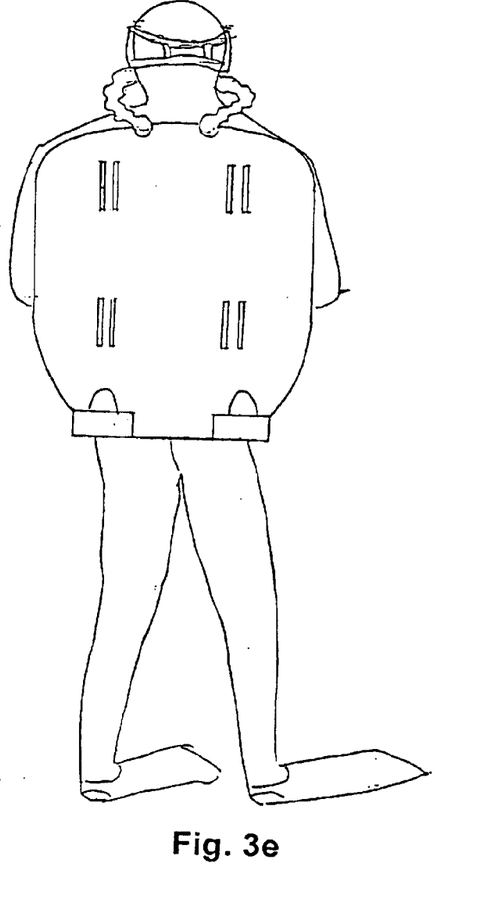
Figure 3F:
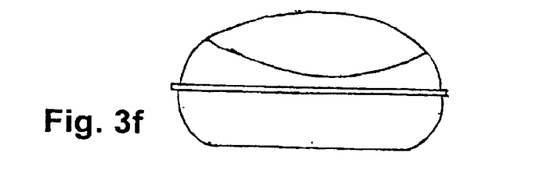

The most important property of the of the second exemplary embodiment, as illustrated in FIG. 1a, is the fact that the process of the ready-made gas use, enrichment of the used gas, production of new gas and its storage under high pressure in one of the two high-pressurized containers (15, 29) is effected within a period of 20–30 min or more. Meanwhile, the diver can use automatically or manually certain inert gases, combine different inert gas mixtures, observe the inert gas production and oxygen-encrichment process, control it, and if necessary, correct it.

In relation with the use of hydrogen as a possible breathing gas in the new pressure-pendulum-storage method, another use is also possible which refers to energy—and power supply of the autonomous back-worn rebreather, namely the power-electric-supply by a fuel cell. Most suitable for the purpose are the alkaline fuel cells (AFC) which, as high-efficient current-producing electro-chemical sources, are supplied with pure oxygen and pure hydrogen. When placed in a pressure-compensated-for vessel, the fuel cell can be supplied with the available hydrogen and oxygen, and in this way can power-supply the new rebreather in the course of many hours.

Other types of fuel cells (hydrogen-air) are also possible, combined with the new type of lithium-ion accumulators which can substantially improve power supply.

In relation wth the use of the different inert gas mixtures with oxygen, hydrogen including, the operation principle of the new pressure-pendulum-storage method is considered in greater detail in FIG. 1a.

The rebreather operates at depth up to 200 m, according to the method, described in the main patent. Above this depth it is possible, by the diver's choice, to add additionally to the mixture breathing gas (consisting of helium and oxygen), certain controlled amount of hydrogen, based on constant dosage principle, out of the high-pressurized gas container (16-a), through a high-pressure connection to a one-stage pressure-reducer and dose-nozzle (10-a) directly into the mixing chamber (27-a) where it gets mixed with the inflowing inert gas helium and the respective oxygen share (less than 3 Vol. %), based on constant dosage principle, gets pumped-in the explosion-proof compressor (23), and is stored under high pressure (220–450 bar) in the empty high-pressurized container (15). This process takes about 20–30 min, until the whole quantity of helium, oxygen, and the dosed quantity of hydrogen are stored in the high-pressurized container (15). The precise dosing of hydrogen is effected by a flow-controller (17-a).

Immediately afterwards, the valve of the pressurized container (6-a) is closed, the 4-stage valve (31) is automatically or manually switched over, and this time from the pressurized container (15), the pressure of the prepared breathing gas is reduced up to above-crucial pressure, and through doze-nozzle (39) of the control panel (1), it is transferred to the inhalation bag (37) or directly to the diving helmet (6). The exhaled breathing gas is brought to the closed circuit, consisting of: exhalation bag (11), CO2-absorption filters (16, 17), a membrane low-pressure pump (13), inhalation bag (37), and diving helmet (6). The excessive breathing gas is pumped-in by the compressor (23). The oxygen content is fed in dosed quantity, based on constant dosage principle to the mixing camera (27-a), then the breathing gas is transported from the compressor (23) under high pressure to the filter (18), where the cleaned and dried up gas if finally stored under high pressure in the now empty container (29).

The oxygen dosing and control is effected additionally by a flow-controller (17-b).

If the diver has to emerge above the depth limit of 100 m towards the surface (it is possible to emerge to a depth of 50 m with minimal oxygen quantity of 3 Vol. % in the breathing gas), it is absolutely necessary to remove hydrogen from the breathing mixture or to use another breathing mixture. The separation can be done in the diffusion cell (18-a) by the use of palladium membrane. Hydrogen diffuses through this membrane at temperature of 280° C., and can be stored by the use of hydride-storer or can be catalitically transferred into water. The oxygen still contained in the breathing gas reacts with hydrogen at the palladium-membran into water and is released with the flowing-out helium. Helium and water in the gaseous form are transported through filters (18), where the breathing gas gets dried-up, and stored under high pressure in one of the two pressurized containers (15 or 29). Since the breathing gas contains no more oxygen, so oxygen is transported, based on constant dosage, directly into the respective pressurized container (15 or 29), through the valve and dosing nozzle (30-a). In this way, hydrogen is removed from the breathing gas after several release cycles. In order to be sure that there is no more hydrogen in the breathing gas, hydrogen detectors (19-a and 26-a) are installed, as well as 2 oxygen-meters (19-b and 26-b).

The complex process of hydrogen separation can be needless if a man dives with the rebreather at depths from 100 up to 700 m and back till 100 m.

In the diving region of 0–600 m, instead of hydrogen, different gaseous mixtures can be used, consisting of oxygen, nitogen, and helium. At depth of 0–50 m, different gaseous mixtures based on the oxygen-nitrogen combination, are possible.

For the purpose of better power-supply, instead of accumulator (19), in the compensated-under-pressure vessel, an alkaline fuel cell can be added. It is supplied with oxygen from pressurized container (28), and with hydrogen from pressurized container (6-a). The possibility also exists for a hydrogen hydride-preserver to be installed in the accumulator's place. In this way, the power-supply, and respectively the diving time of the rebreather are considerably improved. The available hydrogen can be made use of by catalytc burning for the production of hot water to warm-up the breathing gas, the rebreather, and the diver.

Additionally, on the rebreather are mounted vertical electrically-driven motors with propellers (20-a and 25-a) to provide for a better manoeuvring of the diver in the vertical direction.

In this method, and the implementing it autonomous back-worn rebreather, designed for the autonomous production, enrichment, and supply of breathing gas to divers at depths of 0–1000 m, in one closed circuit-pendulum-storage system, a definite quantity of ready-made gas breathing mixture, consisting of different inert gases and oxygen, is continuously conveyed between two high-pressurized containers (15, 29), whereas in the beginning, the needed breathing gas is supplied by the full container, based on the overdosing and constant dosage principle within the closed circuit, consisting of inhalation bag (37), a diving helmet (6), exhalation bag (11), and one or two CO2-filters (16, 17).

At depths of 0–100 m, the used breathing gas is a mixture of oxygen, nitrogen, and helium; at depths of 100–1000 m, by the diver's preference, a definite quantity of hydrogen is added to the breathing mixture, whereas the oxygen content must not exceed 3 Vol. %.

The advance of the breathing gas along this closed circuit is speeded-up by a low-pressure membrane pump (13); the breathing gas is cleaned of CO2 and other contaminants, dried and warmed-up. Finally, the excessive breathing gas is enriched with pure oxygen according to the admissible oxygen partial pressure for the respective depth, based on the constant dosage in the mixing camera (27-a); it is mixed with different inert gases (hydrogen including), in case of necessity or on eventual loss, based on the constant dosage; then, it is pumped-in by a compressor (23) (piston or diaphragm construction), and stored under high pressure (220–450 bar) in one of the two high-pressurized containers, which at the beginning is empty s (15 or 29). After the whole quantity of breathing gas mixture has been stored in this container, the magnet-valve (31) is automatically or manually switched-over and the same process starts in the reverse direction—from the full vessel to the empty one under pressure.

The high-pressure compressor (23) is driven by one or two direct-current electric motors (21, 24) which are current-supplied by one or more accumulators (19, 26) or by an alkaline fuel cell (AFC) (19). The fuel cell is powered by the available pure oxygen and pure hydrogen, and is stored in a pressure-compensated-for vessel.

In case of emerging at a depth smaller than 100 m, hydrogen is removed from the breathing gas and the closed circuit through a palladium-membrane diffusion cell (18-a) or is catalytically transformed into water. The removal is controlled by the hydrogen detectors. Only then is the oxygen content enriched above 3 Vol. %.

What is claimed is:

1. A method for the autonomous production, enrichment and supply of breathing gas to a diver, the method comprising the steps of:

continuously conveying between at least two pressurized containers a breathing gas mixture which comprises an inert gas and oxygen, wherein the at least two pressurized containers are a part of a closed circuit system;

conveying the breathing gas mixture from one of the at least two pressurized containers to a breathing area;

exhaled breathing gas mixture is then conveyed to a carbon dioxide absorption filter by means of a low pressure membrane pump wherein a portion of carbon dioxide is removed from the breathing gas mixture exhaled by the diver by the carbon dioxide filter;

enriching the exhaled breathing gas mixture with oxygen, based on constant dosage according to an admissible partial oxygen pressure for the respective depth, to compensate for loss;

exiting a portion of the breathing gas mixture, the portion of the breathing gas based on an overdosing and constant dosage principle;

transferring the exiting portion of the breathing gas to another one of the at least two pressurized containers and storing the exiting portion in the another one of the at least two pressurized containers at a pressure of between 220 and 450 bar; and reversing the flow of the continuously conveyed breathing gas when the another of the at least two pressurized tanks becomes full such that the continuously conveyed breathing gas is transferred to the less full one of the at least two pressurized containers.

2. The method for the autonomous production, enrichment and supply of breathing gas to a diver of claim 1, further comprising the step of drying and warming the breathing gas mixture.

3. The method for the autonomous production, enrichment and supply of breathing gas to a diver of claim 2, further comprising the step of warming the diver with heat from a fluid wherein the fluid is heated by transferring heat generated by the compression of the dried, warmed, and enriched breathing gas to the fluid.

4. The method for the autonomous production, enrichment and supply of breathing gas to a diver of claim 1, further comprising the steps of:

providing an additional quantity of breathing gas to the diver from a demand regulator on an inhalation bag; and releasing excessive breathing gas from an outlet on an exhalation bag to surrounding media.

5. A system for the autonomous production, enrichment and supply of breathing gas to a diver comprising:

two pressurized containers connected to one another such that fluid is able to flow between the two pressurized containers, the two pressurized containers comprise a closed circuit storage system;

a breathing gas comprising inert gas and oxygen contained in the two pressurized containers;

a low pressure membrane pump for transferring a portion breathing gas after the portion of the breathing gas is exhaled by the diver;

a carbon dioxide absorption filter for receiving the exhaled breathing gas by the low pressure membrane pump and for removing a portion of carbon dioxide from the breathing gas exhaled by the diver by the carbon dioxide filter;

means for delivering a supply of pure oxygen to the system for enriching the filtered breathing gas exhaled by the diver, wherein the supply of the pure oxygen added is based on a constant dosage according to the admissible partial oxygen pressure for the respective depth;

a compressor for compressing the enriched breathing gas into a less full one of the two pressurized containers at a pressure of between 220 and 450 bar;

a flow control means for reversing the flow of the breathing gas when one of the at least two pressurized tanks becomes full such that the continuously conveyed breathing gas is transferred to the less full one of the at least two pressurized containers.

6. A system for the autonomous production, enrichment and supply of breathing gas to a diver of claim 5, wherein the low pressure membrane pump includes electromagnets driven by electric impulses.

7. A system for the autonomous production, enrichment and supply of breathing gas to a diver of claim 5, wherein the low pressure membrane pump includes an electric motor.

8. A system for the autonomous production, enrichment and supply of breathing gas to a diver of claim 5, wherein the compressor is one of a piston version mini compressor and a diaphragm version mini-compressor outputting as much as 150 L/min.

9. A system for the autonomous production, enrichment and supply of breathing gas to a diver of claim 5, wherein the compressor is powered by two direct-current electric motors operating at 12V/24V, 2 to 3 kW, and 2000–3000 U/min.

10. A system for the autonomous production, enrichment and supply of breathing gas to a diver of claim 5, wherein the compressor is powered by at least one accumulators 12V/24V with capacity of at least 100 Ah and the accumulators are housed in oil filled boxes.

11. A system for the autonomous production, enrichment and supply of breathing gas to a diver of claim 10, wherein the accumulators are of the lead/acid type.

12. A system for the autonomous production, enrichment and supply of breathing gas to a diver of claim 10, wherein the accumulators are of the nickel/cadmium type.

13. A system for the autonomous production, enrichment and supply of breathing gas to a diver of claim 10, wherein the accumulators are of the silver/zinc type.

14. A system for the autonomous production, enrichment and supply of breathing gas to a diver of claim 10, wherein the accumulators are of the lithium-ion type.

15. A system for the autonomous production, enrichment and supply of breathing gas to a diver of claim 10, further comprising an alkali ne fuel cell for powering the system.

16. A system for the autonomous production, enrichment and supply of breathing gas to a diver of claim 10, wherein the compressor and the two electric motors are placed in a steel container and are oil-cooled by a heat exchanger for transferring the heat to water wherein the heated water is supplied to the diver at temperature of 45-50° C. to warm the diver.

17. A system for the autonomous production, enrichment and supply of breathing gas to a diver of claim 5, further comprising:

an inhalation bag with a demand regulator to provide an additional quantity of breathing gas in case of need; and an exhalation bag with an outlet valve to release excessive breathing gas into the surrounding medium in case of need.

18. A system for the autonomous production, enrichment and supply of breathing gas to a diver of claim 15, further comprising:
   a safety valve attached to the exhalation bag wherein the safety valve prevents flow of exhaled breathing gas to the compressor and turns off the compressor if the pressure of the exhaled breathing gas is below a predetermined level; and
   a non-return valve attached to the inhalation bag wherein the non-return valve prevents the flow of breathing gas from the inhalation bag to the compressor.

19. A system for the autonomous production, enrichment and supply of breathing gas to a diver of claim 5, further comprising at least one propulsion unit powered by electricity from the accumulators for moving the diver through the surrounding media in a vertical and horizontal direction for a distance of at least 30 km.

20. A system for the autonomous production, enrichment and supply of breathing gas to a diver of claim 5, further comprising a controller panel adapted to display information to the diver and accepting inputs from the diver for controlling constant dosage of the breathing mixture.

21. A system for the autonomous production, enrichment and supply of breathing gas to a diver of claim 5, further comprising a computer adapted to provide to the diver a picture of all needed parameters wherein said parameters comprise: gas inflow; gas stock; gas and environmental pressure; gas and water temperature; diving time; dekostops; pumping and supply power of the compressor; available current capacity; oxygen and carbon dioxide content; rotation number of electric motors; temperature of heated water and supplied amount of heated water; distance; velocity of water currents; advance velocity; and navigation parameters.

22. A system for the autonomous production, enrichment and supply of breathing gas to a diver of claim 5, further comprising a winch having a cable drum, an inflatable floatation body, a bliz-light, and quick detection antenna adapted to enable the diver to establish, at any time and depth electric, video or audio connection with one of a surface of surrounding media and a control office.

23. A system for the autonomous production, enrichment and supply of breathing gas to a diver of claim 5, further comprising a streamlined exterior housing adapted to reducing current resistance and achieving greater velocity.

24. A method for the enrichment and supply of breathing gas to a diver, the method comprising the steps of:
   conveying a breathing gas mixture, which comprises an inert gas and oxygen, from one pressurized container to a breathing area;
   conveying exhaled breathing gas mixture to a carbon dioxide absorption filter by means of a low pressure membrane pump;
   enriching the exhaled breathing gas mixture with oxygen, based on constant dosage according to an admissible partial oxygen pressure for the respective depth;
   filtering the enriched exhaled breathing gas mixture using the the carbon dioxide filter to remove a portion of carbon dioxide from the enriched exhaled breathing gas mixture;
   conveying a first portion of the filtered breathing gas mixture to the breathing area;
   conveying a second portion of the filtered breathing gas mixture to another pressurized container and storing the second portion in the another pressurized containers at a pressure of between 220 and 450 bar; and
   reversing the flow of the continuously conveyed breathing gas when the another pressurized tank becomes full such that the breathing gas mixture is transferred to the less full one of the two pressurized containers.

25. A method for the enrichment and supply of breathing gas to a diver, the method comprising the steps of:
   conveying a breathing gas mixture, which comprises an inert gas and oxygen, from one pressurized container to a breathing area;
   conveying exhaled breathing gas mixture to a carbon dioxide absorption filter by means of a low pressure membrane pump;
   filtering the exhaled breathing gas mixture using the the carbon dioxide filter to remove a portion of carbon dioxide from the breathing gas mixture exhaled by the diver;
   conveying a first portion of the filtered breathing gas mixture to the breathing area;
   enriching a second portion of the filtered breathing gas mixture with oxygen, based on constant dosage according to an admissible partial oxygen pressure for the respective depth;
   conveying the enriched second portion of the breathing gas mixture to another pressurized containers and storing the enriched second portion in the another pressurized containers at a pressure of between 220 and 450 bar; and
   reversing the flow of the continuously conveyed breathing gas when the another pressurized tank becomes full such that the breathing gas mixture is transferred to the less full one of the two pressurized containers.

26. A system for the enrichment and supply of breathing gas to a diver, the system comprising:
   a first pressurized container connected to a second pressurized container such that fluid is able to flow between the two pressurized containers, the two pressurized containers comprise a closed circuit storage system;
   a first conduit connecting the first pressurized container to a valve;
   a second conduit connecting the second pressurized container to the valve;
   a third conduit connecting the valve to a breathing area;
   a fourth conduit for conveying exhaled breathing gas;
   a low pressure membrane pump for transferring the exhaled breathing gas through the fourth conduit;
   a fifth conduit for delivering a supply of oxygen to the fourth conduit for enriching the breathing gas exhaled by the diver;
   means for controlling the supply of the oxygen based on a constant dosage according to the admissible partial oxygen pressure for the respective depth;
   a carbon dioxide absorption filter connected to the fourth conduit for receiving the exhaled breathing gas and for removing a portion of carbon dioxide from the breathing gas exhaled by the diver;
   a sixth conduit for delivering a first portion of the enriched and filtered breathing gas to the breathing area;
   a compressor for compressing a second portion of the enriched and filtered breathing gas into the second pressurized container at a pressure of between 220 and 450 bar;
   a seventh conduit for delivering the second portion of the enriched and filtered breathing gas to the compressor;
   a flow control means for reversing the flow of the breathing gas when one of the at least two pressurized tanks becomes full such that the breathing gas is transferred to the less full one of the two pressurized containers.

27. A system for the enrichment and supply of breathing gas to a diver, the system comprising:

a first pressurized container connected to a second pressurized container such that fluid is able to flow between the two pressurized containers, the two pressurized containers comprise a closed circuit storage system;

a first conduit connecting the first pressurized container to a valve;

a second conduct connecting the second pressurized container to the valve;

a third conduit connecting the valve to a breathing area;

a fourth conduit for conveying exhaled breathing gas;

a low pressure membrane pump for transferring the breathing gas through the fourth conduit;

a carbon dioxide absorption filter connected to the fourth conduit for receiving the exhaled breathing gas and for removing a portion of carbon dioxide from the breathing gas exhaled by the diver;

a sixth conduit for delivering a first portion of the filtered breathing gas to the breathing area;

a compressor for compressing a second portion of the filtered breathing gas into the second pressurized container at a pressure of between 220 and 450 bar;

a seventh conduit for delivering the second portion of the filtered breathing gas to the compressor;

a fifth conduit for delivering a supply of oxygen to the seventh conduit for enriching the filtered breathing gas;

means for controlling the supply of the oxygen based on a constant dosage according to the admissible partial oxygen pressure for the respective depth;

a flow control means for reversing the flow of the breathing gas when one of the at least two pressurized tanks becomes full such that the breathing gas is transferred to the less full one of the two pressurized containers.

* * * * *